3,238,265
PRODUCTION OF OLIGOMERS OF 1,3-DIENES
Herbert Mueller, Ludwigshafen (Rhine), Gartenstadt, Germany, assignor to Badische Anilin- & Soda-Fabrik Aktiengesellschaft, Ludwigshafen (Rhine), Germany
No Drawing. Filed Sept. 14, 1961, Ser. No. 137,964
Claims priority, application Germany, Sept. 21, 1960, B 59,453
7 Claims. (Cl. 260—666)

This invention relates to a new process for the production of oligomers of 1,3-dienes, especially of dimers of 1,3-dienes. Stated more precisely, the invention relates to the production of the said oligomers with the aid of a new type catalyst. The invention further relates to the new catalyst itself.

It is known that butadiene-(1,3) can be partly converted by heating into cyclooctadiene-(1,5) and vinylcyclohexene-(3). The ratio in which the said substances are formed is displaced in favor of cyclooctadiene-(1,5) as the temperature is raised, but the yield of this diene, with reference to the butadiene-(1,3) used, is only 6% even at 270° C.

It is also known that butadiene-(1,3) can be converted by a catalytic method into vinylcyclohexene-(3) and cyclooctadiene-(1,5), the yield of the latter substance being about 40%. The catalysts used are nickel compounds of the general formula:

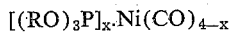

$$[(RO)_3P]_x \cdot Ni(CO)_{4-x}$$

in which R denotes an alkyl or aryl radical and $x$ stands for one of the numbers 1, 2 and 3.

It is also known that cycloolefins with at least eight carbon atoms are obtained when a conjugated diolefinic compound is treated in the presence of acetylene with a catalyst which has been prepared from nickel carbonyl by replacement of at least one of the carbonyl groups by a compound of trivalent nitrogen or phosphorus. The yields of cyclooctadiene-(1,5) by this process are up to 44% with reference to the butadiene-(1,3) used. Besides the poor yields of cyclooctadiene, a disadvantage of the process operated with catalysts prepared from nickel carbonyl is that the space-time yields are also unsatisfactory.

A number of methods have become known by which the 1,3-dienes are converted mainly into cyclic trimers. The catalysts therefor are obtained from aluminum alkyls or alkylaluminum halides on the one hand and from chromium or titanium halides on the other hand. By these methods, cyclic dimers are obtained only in minor amounts. It must also be regarded as a disadvantage that spontaneously ignitable substances are required for making the catalysts. Furthermore considerable amounts of rubberlike polymers are formed in the reaction and these not only diminish the yield but also make difficult the continuous operation of the process.

It is an object of the present invention to provide a process by which good yields of dimers of 1,3-dienes are achieved. It is another object of the invention to provide a process which gives good space-time yields. A further object of the invention is to provide a process which operates with catalysts requiring no spontaneously ignitable compounds. A further object of the invention is to provide the said catalysts themselves. Further objects of the invention will become apparent from the following detailed description of our invention.

In accordance with this invention it has been found that the said objects are achieved by contacting a 1,3-diene with a catalyst which is obtained by mixing, in any sequence:
  (a) A nickel (II) compound,
  (b) A metal having a reducing action on the nickel (II) compound and
  (c) An organic compound of an element of Group VA of the periodic chart of the elements. References to groups of the periodic chart in the present specification are to the periodic chart in which the transitional elements are in the B groups while the remaining elements are in the A groups.

In many cases more than 95% of the 1,3-diene used is converted into the dimer by the new process. In addition trimers and higher oligomers of the initial materials which are hovere still liquid and readily soluble in organic solvents are obtained.

The preferred initial material for the new process is butadiene-(1,3). Butadienes-(1,3) which are substituted by lower alkyl radicals and those compounds in which the 1,3-diene structure is incorporated into a cycloaliphatic ring may also be used with good results. Examples of suitable initial materials are: 2-methylbutadiene-(1,3), 2,3-dimethylbutadiene-(1,3), 2-ethylbutadiene-(1,3), pentadiene-(1,3), hexadiene-(1,3), hexadiene-(2,4), cyclohexadiene-(1,3) and cyclooctadiene-(1,3). The preferred initial materials are conjugated alkadienes with 4 to 6 carbon atoms.

The 1,3-diene need not be pure, but may be used in admixture with other substances which are inert under the conditions of the process. For example, a gas mixture containing butadiene-(1,3) which has been obtained by dehydrogenation of butane or butenes may be used with good results.

Of the nickel (II) compounds there may be used with special advantage the salts of inorganic or organic acids and chelate complexes of divalent nickel. By chelate complexes we understand those complexes in which the metal atom is attached to two functional groups of a molecule, by a main valency and coordinatively. Chelate complexes thus have ring structure. They may contain, beside two molecules of complex-forming agent, such as acetylacetone, an alcohol or phenol in a solvate-like form. Suitable nickel (II) compounds of this type include nickel chloride, nickel cyanide, nickel bromide, nickel iodide, nickel carbonate, nickel formate, nickel acetate, nickel oxalate, nickel benzoate, nickel sulfate, nickel nitrate, nickel acetylacetonate, nickel acetylacetonate dialcoholate, nickel acetylacetonate diphenolate, nickel acetoacetic esters, nickel benzoylacetonate and nickel dimethyl glyoxime. Other suitable nickel compounds include nickel (II) oxide, nickel (II) hydroxide, nickel (III) hydroxide and nickel sulfide. The nickel compounds are preferably used in anhydrous form. Nickel compounds containing water, for example water of crystallization, may be used if the water is removed in suitable form, for example by adding an appropriate excess of the said metals.

The metals which are capable of reducing the nickel compounds belong to Groups IA, IIA or IIIA or the lanthanide group of the periodic system. Of the suitable metals it is preferred to use lithium, sodium, potassium, beryllium, magnesium, calcium, strontium, barium, aluminum, gallium, indium and cerium. They are conveniently used in a condition in which they have a large surface, for example in the form of chips or powder. Commerical and also highly refined metals may be used. Obviously, alloys or mixtures of two or more of the said metals may also be used.

A third group of substances which is essential for the production of the catalyst are organic compounds of elements of Group VA of the periodic system with an atomic weight of at least 30, preferably between 30 and 122. In the preferred compounds of this kind, the element is present in trivalent form. Readily reducible compounds having the valency 5 may also be used. Suitable substances of the kind described thus belong in the groups of the organic phosphines, phosphine oxides, arsines, stibines, phosphorous acid esters, thiophosphorous acid esters, and phosphorous acid triamides substituted by organic radicals. The preferred compounds are those of trivalent phosphorus which bear aryl radicals, in particular phenyl radicals, attached by way of an oxygen, sulfur or nitrogen atom and which contain a substituent in o-position to the hetero bridge. Suitable compounds include triethyl phosphine, tributyl phosphine, triphenyl phosphine, tritolyl phosphines, triphenyl arsine, tritolyl arsines, triphenyl stibine, triethyl phosphite, triphenyl phosphite, tri-$\beta$-naphthyl phosphite, tri-p-methoxyphenyl phosphite, tri-p-chlorophenyl phosphite, tri-m-bromophenyl phosphite, triphenyl thiophosphite ($P(SC_6H_5)_3$), triphenyl phosphine oxide and trimorpholyl phosphine. Of the preferred compounds, the following are examples: tri-(o-tolyl) phosphite, tri-(2,4-dimethylphenyl) phosphite, tri-(2,6-dimethylphenyl) phosphite, tri-(o-isopropyl) phosphite, tri-thymyl phosphite (tri-(2-isopropyl - 5 - methylphenyl) phosphite), tri-(2,4-di-isopropylphenyl) phosphite, tri-(o-octylphenyl) phosphite, tri-(o-diphenylyl) phosphite, tri-($\alpha$-naphthyl) phosphite, tri-(o-chlorophenyl) phosphite, tri-(2,4-dichlorophenyl) phosphite, tri-2,6-dichlorophenyl) phosphite, tri-(2-bromophenyl) phosphite, tri-(2,4-dimethoxyphenyl) phosphite, tri-(2-butoxyphenyl) phosphite, tri-(o-tolyl) thiophosphite, tri-($\alpha$-naphthyl) thioposphite, tri-(2-chlorophenyl) thiophosphite, N,N',N''-tris-(2-methylphenyl) phosphorous acid amide and N,N', N''-tris-(2-ethylphenyl) phosphorous acid amide.

In many cases the coemployment of a halide of an element of Groups IIB or IIIA of the periodic system is of advantage. In many cases an increased reaction speed and a variation in the composition of the reaction product is thereby obtained. In the reaction of butadiene-(1,3), for example, the proportion of vinylcyclohexane-(3) is as a rule increased as compared with cyclooctadiene-(1,5) when a metal halide is coemployed in the production of the catalyst.

Of the halides, the bromides and chlorides are preferred. Examples of suitable compounds are: boron trichloride, aluminum chloride, aluminum bromide, gallium bromide, indium chloride, thallium chloride, zinc chloride and cadmium chloride. Mixtures of the halogen compounds may obviously also be used. The halides of the elements of Group IIB or IIIA are conveniently used in amounts of 0.1 to 1.0 mole with reference to the nickel compound.

The amounts in which the said components are used in the production of the catalyst system may vary within wide limits. Good results are obtained, for example, when the nickel compound, metal and compound of an element of Group VA are used in the ratio 1:300:10 or 1:10:0.5 (expressed in moles or gram atoms). The best results are achieved with catalysts in which the mole ratio of nickel (II) compound to the compound of an element of Group VA of the periodic system with an atomic weight of at least 30 is between about 1:1 and 1:3. It is also possible to increase the proportion of the nickel compound as compared with the two other components beyond the figures given in the two proportions. The catalyst need only be used in a small amount with reference to the 1,3-diene. The reaction proceeds with satisfactory speed even with an amount of catalyst of only 0.3% by weight with reference to the 1,3-diene reacted.

The new process may be carried out within a wide temperature range, namely, between about 0° and 250° C. The most favorable reaction temperature lies between 50° and 150° C. At lower temperatures the reaction speed is low and at higher temperatures byproducts occur in increasing amounts.

The reaction may be carried out at atmospheric pressure, but usually increased pressures, determined by the vapor pressure of the 1,3-diene and the solvent used at the reaction temperature, are applied. Suitable pressures are for example pressures up to 30 atmospheres.

It is convenient to carry out the new process in an inert solvent. Suitable solvents include aliphatic, cycloaliphatic and aromatic hydrocarbons, ethers and esters, such as hexane, heptane, cyclohexane, benzene, cyclooctene, hydrocarbon mixtures of petroleums boiling between about 60° and 200° C., tetrahydrofurane, dioxane, diisopropyl ether and ethyl acetate. It is recommendable to use carefully purified, anhydrous solvents. Obviously, mixtures of the said solvents may also be successfully used. The solvents are in general used in amounts of 0.1 to 5 times that of the 1,3-diene.

Generally speaking, the catalysts are prepared by mixing the components in any sequence.

To carry out the process it is advantageous first to "develop" the catalyst by intimately and thoroughly mixing for some hours, for example for 1 to 20 hours, the nickel compound and the metal, if desired together with the compound of Group VA and the halide, in the solvent to be used for the reaction and in an inert gas atmosphere. Mixing may take place at room temperature, but elevated temperatures may be used, for example 50° to 150° C. When using alkali metals it is often advantageous to use temperatures which lie above the melting point of the metal. Mixing may be effected in a ball mill or by means of an efficient stirrer. Suitable inert gases include nitrogen and argon.

It is often of advantage to add to the batch, prior to, during or after mixing, a small amount, e.g., 1 to 10% by weight with reference to the mixture, of the 1,3-diene which is to be reacted in the actual reaction to follow, or another hydrocarbon with single or multiple unsaturation. By hydrocarbons with multiple unsaturation we mean hydrocarbons with two or more double linkages or at least one triple linkage.

Suitable unsaturated hydrocarbons include butene-(1), isobutene, dodecene-(1), butadiene-(1,3), dimethylbutadiene-(1,3), 2,3-dimethylbutadiene-(1,3), 2 - methylbutadiene - (1,3), cyclooctadiene - (1,3), cyclooctatetraene, cyclododecatriene-(1,5,9), cyclooctadiene-(1,5), styrene, $\alpha$-methylstyrene, methylacetylene, vinylacetylene, phenylacetylene and diphenylacetylene. The activity of the catalyst system is improved in many cases by such an addition.

The 1,3-diene is introduced into the catalyst mixture thus obtainable after it has been brought to the desired reaction temperature. To complete the reaction, the temperature is preferably maintained for some time after all the initial material has been added. The reaction product is then distilled to separate the oligomers from the solvent.

The oligomers obtainable according to the new process are valuable solvents, for example, for substances having paraffinic character. Moreover, they are valuable intermediates for further reactions; for example, cyclooctadiene-(1,3) and cyclooctadiene-(1,5) may be hydrogenated in the usual way to cyclooctane which in turn may be catalytically oxidized to cyclooctanone and cyclooctanol. The last-mentioned compounds are known to be valuable initial materials for polyamides.

The invention is illustrated by, but not limited to, the following examples in which parts are parts by weights.

*Example 1*

5 parts of aluminum, 5 parts of triphenyl phosphine and 1.4 parts of nickel acetylacetonate are ground in 180 parts of benzene in a vibratory mill for 15 hours at room temperature and in an argon atmosphere. The catalyst solution thus obtained is charge—similarly in an argon atmosphere—into a pressure vessel and heated to 100° C. The argon is expelled by means of butadiene-(1,3) and a constant pressure of atmospheres is maintained by supplying fresh butadiene-(1,3) at the rate at which it is used up. 200 parts of butadiene-(1,3) is reacted in this way within six hours. The reaction is then discontinued although it would still proceed with undiminished speed. The pressure vessel is cooled and depressured and the brownish reaction product is filtered. From the filtrate, by distillation through an efficient packed column, there are obtained, besides the benzene used as solvent, 170 parts of cyclooctadiene-(1,5) of the boiling point 85° C. at 100 mm. Hg and with the refractive index $n_D^{20}=1.4934$, 18 parts of vinylcyclohexene-(3) of the boiling point 60° C. at 100 mm. Hg and with the refractive index $n_D^{20}=1.4650$, and 2 parts of trans,trans,trans-cyclododecatriene-(1,5,9) of the melting point 34° C. Finally, 4 parts of a brown oil remains as distillation residue.

*Example 2*

A catalyst suspension is prepared in the way described in Example 1 from 180 parts of benzene, 1.4 parts of nickel acetylacetonate, 5 parts of aluminum and 3 parts of triphenyl phosphine. The further procedure of Example 1 is followed and the reaction discontinued as soon as 304 parts of butadiene-(1,3) has been reacted. From a gas chromatographic analysis of the reaction mixture it results that the reacted butadiene-(1,3) has been converted to the extent of 84% into cyclooctadiene-(1,5), 14% into vinylcyclohexene-(3), 1% into trans,trans,trans-cyclododecatriene-(1,5,9) and 1% into higher oligomers.

*Example 3*

The procedure of Example 1 is followed but the catalyst is prepared from 180 parts of benzene, 1.4 parts of nickel acetylacetonate, 5 parts of calcium and 5 parts of triphenyl phosphine. Within six hours, 175 parts of butadiene-(1,3) are reacted, 75% into cyclooctadiene-(1,5), 20% into vinylcyclohexene-(3), 1.2% into trans,trans,trans-cyclododecatriene-(1,5,9) and 1 to 2% into higher butadiene oligomers.

*Examples 4 to 22*

The procedure of Example 1 is followed but using other catalyst systems. The results are tabulated in the following table in which:

Column A gives number of the example
Column B gives the composition of the catalyst
Column C gives the weight in parts of butadiene reacted
Column D gives the percentage yield of cyclooctadiene-(1,5)
Column E gives the percentage yield of vinylcyclohexene-(3)
Column F gives the percentage yield of cyclododecatriene-(1,5,9)
Column G gives the percentage yield of higher butadiene oligomers

| A | B | C | D | E | F | G |
|---|---|---|---|---|---|---|
| 4 | 180 parts benzene / 1.4 parts nickel acetylacetonate / 5 parts aluminum / 0.5 part aluminum chloride / 5 parts triphenylphosphine | 160 | 70 | 25 | 2 | 3 |
| 5 | 180 parts benzene / 1.4 parts nickel acetylacetonate / 6 parts cerium / 6 parts triphenyl phosphine | 40 | 76 | 19 | 2 | 2 |
| 6 | 180 parts benzene / 1 part nickel chloride / 5 parts magnesium / 5 parts triphenyl phosphine | 186 | 60 | 36 | 2 | 2 |
| 7 | 180 parts heptane / 1.4 parts nickel acetylacetonate / 5 parts aluminum / 0.5 part aluminum chloride / 5 parts triphenyl phosphine | 20 | 49 | 48 | 1 | 2 |
| 8 | 90 parts benzene / 0.7 part nickel acetylacetonate / 1 part trans,trans,trans-cyclododecatriene-(1,5,9) / 2 parts aluminum / 2 parts triphenyl phosphine | 120 | 82 | 11 | 6 | 1 |
| 9 | 180 parts benzene / 1.4 parts nickel acetylacetonate / 1 part lithium / 5 parts triphenyl phosphine / 10 parts zinc chloride | 15 | 60 | 30 | ------ | 10 |
| 10 | 50 parts tetrahydrofurane / 0.7 part nickel acetylacetonate / 2.5 parts calcium / 2.5 parts triphenyl phosphine | 100 | 72 | 20 | 6 | 2 |
| 11 | 180 parts benzene / 1.4 parts nickel acetylacetonate / 5 parts calcium / 5 parts triphenyl phosphite | 110 | 93 | 6 | 0.2 | 0.5 |
| 12 | 180 parts benzene / 1.4 parts nickel acetylacetonate / 4 parts magnesium grit / 4 parts triphenyl phosphine oxide | 56 | 23 | 6 | 65 | 5 |
| 13 | 180 parts benzene / 1 part nickel chloride / 2 parts magnesium grit / 4 parts triphenyl stibine | 3 | 38 | 62 | ------ | ---- |
| 14 | 180 parts benzene / 1 part nickel oxide / 4 parts magnesium grit / 4 parts triphenyl phosphine | 60 | 78 | 12 | 4 | 6 |
| 15 | 180 parts benzene / 1 part nickel(II) cyanide / 5 parts magnesium / 5 parts triphenyl phosphine | 80 | 52 | 40 | 5 | 3 |
| 16 | 180 parts benzene / 1 part nickel acetate / 1 part calcium / 4 parts triphenyl phosphine | 60 | 68 | 28 | 2 | 2 |
| 17 | 180 parts benzene / 1 part nickel dimethylglyoxime / 5 parts aluminum / 5 parts triphenyl phosphine | 100 | 70 | 25 | 2 | 3 |
| 18 | 180 parts benzene / 1 part nickel acetylacetonate / 2 parts phenylacetylene / 5 parts aluminum / 5 parts triphenyl phosphine | 190 | 85 | 10 | 3 | 2 |
| 19 | 180 parts benzene / 1.4 parts nickel acetylacetonate / 5 parts styrene / 5 parts aluminum / 2 parts tri-(o-tolyl) phosphite | 250 | 85 | 10 | 2 | 3 |
| 20 | 180 parts benzene / 1.4 parts nickel acetylacetonate / 4 parts sodium / 5 parts triphenyl phosphine | 300 | 65 | 10 | 5 | 20 |
| 21 | 70 parts benzene / 1.4 parts nickel acetylacetonate / 4 parts sodium / 5 parts triphenyl phosphine | 50 | 70 | 15 | 10 | 5 |
| 22 | 180 parts benzene / 1 part nickel acetylacetonate / 4 parts aluminum / 4 parts triphenyl arsine | 15 | 35 | 36 | 4 | 25 |

*Example 23*

A catalyst is prepared in the way described in Example 1 from 50 parts of benzene, 1 part of nickel chloride, 4 parts of magnesium grit and 4 parts of triphenyl phosphine. 30 parts of 2,3-dimethylbutadiene-(1,3) is heated with this catalyst system in a pressure vessel for 24 hours at 100° C. The reaction mixture is distilled after the inorganic components of the catalysts have been filtered off. 7 parts, i.e., 85% of the 2,3-dimethylbutadiene-(1,3) reacted, of dimeric, 2,3-dimethylbutadiene-(1,3) is obtained with a boiling point of 105° C. at 10 mm. Hg and with the refractive index $n_D^{20}=1.4920$.

If the above procedure is followed but isoprene is used instead of 2,3-dimethylbutadiene-(1,3), 15 parts of dimeric isoprene is obtained having the boiling point 60° to 75° C. at 20 mm. Hg and the refractive index $n_D^{20}=1.4870$, and also 10 parts of trimeric isoprene having the boiling point 150° to 160° C. at 20 mm. Hg and the refractive index $n_D^{20}=1.5040$.

*Example 24*

A catalyst is prepared in the way described in Example 1 from 150 parts of benzene, 1.4 parts of nickel acetylacetonate, 3.5 parts of tri-(o-tolyl) phosphite and 5 parts of aluminum grit. 350 parts of butadiene is supplied at a pressure of 1.2 atmospheres gage into the mixture heated to 90° C. within 5 hours. The temperature is maintained for another 2½ hours and the reaction mixture is then allowed to cool. The solution contains 31% of benzene, 65% of cyclo-octadiene-(1,5), 3% of 1-vinyl-cyclohexene-(3) and 1% of higher butadiene oligomers according to gas chromatographic analysis. The yield of cyclo-octadiene-(1,5) is 94% of the theory with reference to the butadiene supplied.

*Example 25*

A mixture of 160 parts of benzene, 20 parts of butadiene, 3.5 parts of tri-(o-tolyl) phosphite, 5 parts of aluminum grit and 1.4 parts of nickel acetylacetonate is ground for 34 hours in a vibratory mill. The resultant catalyst solution is charged to a pressure vessel. 680 parts of butadiene is introduced at 90° C. within 3 hours at a pressure of 1.2 atmospheres gage. The reaction is then discontinued although no diminution in the activity of the catalyst can be detected. The mixture is allowed to cool, filtered and all readily volatile components distilled off from the filtrate without fractionation.

820 parts of distillate is obtained which, besides the benzene used in the production of the catalyst, contains 615 parts of cyclooctadiene-(1,5) (91% of the butadiene converted), 33 parts of 1-vinyl-cyclohexene-(3) (5% of the butadiene converted) and 20 parts of cyclododecatriene-(1,5,9) (3% of the butadiene converted) according to gas chromatographic analysis.

The distillation residue consists of about 5 to 6 parts of butadiene oligomers of higher molecular weight (1% of the butadiene converted).

I claim:

1. In a process for the production of lower oligomers of 1,3-dienes the improvement which comprises using a catalyst which has been formed by mixing in any sequence:
   (a) a nickel (II) compound,
   (b) a metal selected from the class consisting of the metals of Groups I, IIA and IIIA and the lanthanide group of the periodic system, and
   (c) an organic compound of an element of Group VA of the periodic system with an atomic weight of at least 30, said organic compound being a member selected from the group consisting of organic phosphines, phosphine oxides, arsines, stibines, phosphorous acid esters, thiophosphorous acid esters and phosphorous acid triamines substituted by organic radicals.

2. A process as claimed in claim 1 which comprises using a nickel (II) compound selected from the group consisting of inorganic nickel (II) salts, organic nickel (II) salts and chelate complexes of divalent nickel.

3. A process as claimed in claim 1 which comprises using a compound of trivalent phosphorus containing aryl radicals attached to the phosphorous by way of a hetero atom selected from the group consisting of oxygen, sulfur and nitrogen, said aryl radicals bearing a substituent in o-position to the hetero bridge.

4. A process as claimed in claim 1 which comprises coemploying a halide of an element selected from the group consisting of the elements of Groups IIB and IIIA of the periodic system.

5. A process as claimed in claim 1 which comprises using a catalyst which has been obtained by mixing the said components in any sequence in the presence of a hydrocarbon selected from the group consisting of hydrocarbons having single and multiple unsaturation.

6. A catalyst for the oligomerization of 1,3-dienes which has been obtained by mixing in any sequence:
   (a) a nickel (II) compound,
   (b) a metal selected from the class consisting of the metals of Groups IA, IIA and IIIA and the lanthanide group of the periodic system, and
   (c) an organic compound of an element of Group VA of the periodic system with an atomic weight of at least 30 said organic compound being a member selected from the group consisting of organic phosphines, phosphine oxides, arsines, stibines, phosphorous acid esters, thiophosphorous acid esters and phosphorous acid triamides substituted by organic radicals.

7. A catalyst for the oligomerization of 1,3-dienes which has been obtained by mixing in any sequence:
   (a) a nickel (II) compound selected from the group consisting of inorganic nickel (II) salts, organic nickel (II) salts and chelate complexes of divalent nickel;
   (b) a metal selected from the class consisting of the metals of Groups IA, IIA and IIIA and the lanthanide group of the periodic system; and
   (c) an organic compound of an element of Group VA of the periodic system with an atomic weight of at least 30, said organic compound being a member selected from the group consisting of organic phosphines, phosphine oxides, arsines, stibines, phosphorous acid esters, thiophosphorous acid esters and phosphorous acid triamides substitlted by organic radicals.

References Cited by the Examiner

UNITED STATES PATENTS

| | | | |
|---|---|---|---|
| 2,686,208 | 8/1954 | Reed | 260—666 |
| 2,686,209 | 8/1954 | Reed | 260—666 |
| 2,846,427 | 8/1958 | Findlay | 260—683.15 |
| 2,903,491 | 9/1959 | Reppe et al. | 260—666 |
| 2,962,487 | 11/1960 | Coover | 252—431 |
| 2,969,408 | 1/1961 | Nowlin et al. | 260—683.15 |
| 2,978,523 | 4/1961 | Coyne et al. | 260—683.15 |

FOREIGN PATENTS

| | | |
|---|---|---|
| 613,848 | 1/1961 | Canada. |
| 1,095,819 | 12/1960 | Germany. |
| 343,116 | 2/1931 | Great Britain. |
| 879,269 | 11/1961 | Great Britain. |

DELBERT E. GANTZ, *Primary Examiner.*

A. D. SULLIVAN, *Examiner.*

C. E. SPRESSER, *Assistant Examiner.*